(12) United States Patent
Son et al.

(10) Patent No.: US 10,763,744 B2
(45) Date of Patent: Sep. 1, 2020

(54) PFC CONTROLLER AND METHOD OF CONTROLLING THE SAME

(71) Applicants: Hyundai Motor Company, Seoul (KR); Kia Motors Corporation, Seoul (KR)

(72) Inventors: Gi Bong Son, Gyeonggi-do (KR); Gyu Tae Choi, Gyeonggi-do (KR); Hui Sung Jang, Gyeonggi-do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/154,860

(22) Filed: Oct. 9, 2018

(65) Prior Publication Data
US 2019/0260287 A1  Aug. 22, 2019

(30) Foreign Application Priority Data
Feb. 19, 2018 (KR) .................. 10-2018-0019222

(51) Int. Cl.
*H02M 1/42* (2007.01)
*H02M 1/32* (2007.01)
*H02M 1/00* (2006.01)

(52) U.S. Cl.
CPC .......... *H02M 1/4208* (2013.01); *H02M 1/32* (2013.01); *H02M 2001/0022* (2013.01)

(58) Field of Classification Search
CPC ............ H02M 1/32; H02M 1/36; H02M 1/42; H02M 1/4208; H02M 1/4216;
(Continued)

(56) References Cited

U.S. PATENT DOCUMENTS 5,943,229 A * 8/1999 Sudhoff ................ H02M 3/285
                                                        363/125
9,404,947 B2 * 8/2016 Giuntini ........... G01R 19/16547
(Continued)

FOREIGN PATENT DOCUMENTS

KR        10-1782497 B1      9/2017

OTHER PUBLICATIONS

R. Teodorescu et al., "Proportional-resonant controllers and filters for grid-connected voltage-source converters", IEE Proc.-Electr. Power Appl., vol. 153, No. 5, Sep. 2006. (Year: 2006).*

*Primary Examiner* — Thienvu V Tran
*Assistant Examiner* — Carlos O Rivera-Perez
(74) *Attorney, Agent, or Firm* — Mintz Levin Cohn Ferris Glovsky and Popeo, P.C.; Peter F. Corless

(57) ABSTRACT

Disclosed are a PFC controller and a method of controlling the PFC controller. The PFC controller can include: a voltage controller configured to control a PFC output terminal voltage using a PFC output terminal voltage value and a PFC output terminal requirement voltage value; a current controller configured to control a PFC input terminal current by deriving a PFC input terminal requirement current value using an output of the voltage controller and by deriving a PFC duty using the PFC input terminal requirement current value and a PFC input terminal current value; and a distortion compensator configured to monitor an input voltage of an input power source, determine whether the input voltage is distorted, and prevent a divergence of the PFC input terminal current by transmitting a distortion frequency to the current controller when the input voltage is distorted.

10 Claims, 9 Drawing Sheets

(58) Field of Classification Search
CPC ............ H02M 1/4233; H02M 1/4241; H02M 1/4258; H02M 1/4266; H02M 1/4225; H02M 3/02; H02M 3/04; H02M 3/10; H02M 3/145; H02M 3/155; H02M 3/156; H02M 3/33507; H02M 2001/0009; H02M 2001/0016; H02M 2001/0019; H02M 2001/0022; H02M 2001/0025; H02M 2001/0032; H02M 2001/007; H02M 2001/0067; H02M 2003/1552; H02M 2003/1566; H02M 7/02; H02M 7/04; H02M 7/062; H02M 7/06; H02M 7/12; H02M 7/125; H02M 7/155; H02M 7/19; H02M 7/217; H02M 1/44; H02M 1/12; H02M 1/126; H02M 2001/123; H02M 2001/4283; H02M 2001/4291; Y02B 70/10; Y02B 70/12; Y02B 70/423; Y02B 70/426; Y02B 70/123; Y02B 70/126; G05F 1/70; B60L 11/00; B60L 11/1809; B60L 11/1811; B60L 11/1812; B60L 11/1814; H02J 7/0052; H02J 7/0055
USPC ........ 323/205–211, 222–226, 266, 271–277, 323/280, 282–285, 288, 299–303, 351; 363/21.01–21.03, 35, 45, 46, 50, 56.12, 363/74, 78, 79, 89, 123–127; 320/137, 320/140–146, 155–159, 161, 162

See application file for complete search history.

(56) References Cited

U.S. PATENT DOCUMENTS

| | | | |
|---|---|---|---|
| 2013/0043847 A1* | 2/2013 | Kim | ................... H02M 1/4225 323/207 |
| 2017/0025943 A1* | 1/2017 | Eren | ..................... H02M 1/12 |

* cited by examiner

PFC CONTROLLER AND METHOD OF CONTROLLING THE SAME

CROSS REFERENCE TO RELATED APPLICATION

The present application claims the benefit of priority to Korean Patent Application No. 10-2018-0019222, filed Feb. 19, 2018 in the Korean Intellectual Property Office, the entire contents of which are incorporated herein by reference.

BACKGROUND OF THE DISCLOSURE

Field of the Disclosure

The present disclosure generally relates to a power factor correction (PFC) controller and a method of controlling the same and, more particularly, to a PFC controller and a method of controlling the same for reducing an input overcurrent, improving shutdown of an on-board charger (OBC), and decreasing charge delay due to shutdown.

Description of the Related Art

An on-board charger (OBC) of an environmentally friendly vehicle (e.g., electric vehicle, hybrid vehicle, etc.) refers to a full-speed charger that charges a high-voltage battery of a vehicle using alternating current (AC) power. The OBC can be configured with a power factor correction (PFC) that controls a power factor of an input current and a DC-DC high-voltage converter that controls step-up/step-down of an output voltage.

A PFC controller that controls the PFC can include a voltage controller that controls a DC link voltage $V_{dc}$ that is an output terminal of the PFC and a current controller that controls the input current $I_{in}$. A PFC control exists to satisfy the Power Factor (PF) and a Total Harmonic Distortion (THD) regulation.

The voltage controller of the PFC outputs a root mean square (RMS) instruction of a current of the output terminal of the PFC. Specifically, when an output value of the voltage controller is multiplied by a signal obtained by dividing an input voltage of input power source by a peak value, a PFC output terminal current instruction $I_{in}^*$, the same phase and shape as the input voltage is obtained. The PFC current controller can control the PFC by generating a duty $d_{pfc}$ so that the current $I_{in}$ of the output terminal of the PFC is equal to the current instruction $I_{in}^*$ through proportional-integral (PI) control.

Therefore, if distortion occurs in the input voltage of the power source, the distortion is also reflected by $I_{in}^*$. Also, if a frequency of the distortion is lower than a PFC current control band, the $I_{in}$ follows the $I_{in}^*$. However, if the frequency of the distortion is similar to or higher than the control band, the $I_{in}$ does not follow the $I_{in}^*$, oscillates, or diverges, and thus an input overcurrent occurs.

If the input overcurrent occurs a predetermined number of times, the charge power is limited in order to prevent shutdown of the OBC. Therefore, the amount of time needed to charge the vehicle increases. If the distortion is severe, the OBC is shut down, and charging becomes impossible.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a PFC controller and a method of controlling the PFC controller for reducing an input overcurrent and improving a shutdown of an OBC and a charge delay situation due to the shutdown, by controlling a PFC input terminal current so that the PFC input terminal current is maintained according to a sine wave similar to that which occurs before distortion of an input voltage.

In order to achieve the above object, according to embodiments of the present disclosure, a PFC controller can include: a voltage controller configured to control a PFC output terminal voltage using a PFC output terminal voltage value and a PFC output terminal requirement voltage value; a current controller configured to control a PFC input terminal current by deriving a PFC input terminal requirement current value using an output of the voltage controller and by deriving a PFC duty using the PFC input terminal requirement current value and a PFC input terminal current value; and a distortion compensator configured to monitor an input voltage of an input power source, determine whether the input voltage is distorted, and prevent a divergence of the PFC input terminal current by transmitting a distortion frequency to the current controller when the input voltage is distorted.

The PFC output terminal voltage may be a DC link terminal voltage between a PFC and a high-voltage converter.

The voltage controller may perform proportional-integral (PI) control over the PFC output terminal voltage such that the PFC output terminal voltage corresponds to the PFC output terminal requirement voltage value.

When the distortion compensator determines that the input voltage is not distorted, the current controller may derive the PFC input terminal requirement current value by dividing the input voltage of the input power source by an input voltage peak value so as to scale the input voltage and by multiplying the scaled input voltage value by the output of the voltage controller.

When the distortion compensator determines that the input voltage is not distorted, the current controller may derive the PFC duty by performing PI control over the PFC output terminal voltage such that the PFC input terminal current corresponds to the PFC input terminal requirement current value.

The distortion compensator may generate a monitoring voltage having the same phase as the input voltage of the input power source through a phase locked loop from the input voltage of the input power source, calculate the distortion frequency of the input power source based on a difference between the monitoring voltage and the input voltage input in real-time, and determine that the input voltage is distorted when the distortion frequency is greater than or equal to a PFC current control band.

The PFC current control band may be 1/20 of a PFC switching frequency.

When the distortion compensator determines that the input voltage of the input power source is distorted, the current controller may derive the PFC input terminal requirement current value by dividing the monitoring voltage by a monitoring voltage peak value so as to scale the monitoring voltage and by multiplying the scaled input voltage value by the output of the voltage controller.

The distortion compensator may calculate a frequency of the input power source based on the phase locked loop from the input voltage of the input power source.

When the distortion compensator determines that the input voltage of the input power source is distorted, the current controller may derive the PFC duty by performing proportional-resonant (PR) control over the PFC input terminal current such that the PFC input terminal current corresponds to the PFC input terminal requirement current value using the frequency of the input power source and the distortion frequency of the input power source.

Furthermore, in order to achieve the above object, according to embodiments of the present disclosure, a method of controlling a PFC controller can include: monitoring, by a distortion compensator, an input voltage of an input power source; determining, by the distortion compensator, whether the input voltage of the input power source is distorted; deriving, by a current controller, a PFC input terminal requirement current value using an output of a voltage controller; deriving, by the current controller, a PFC duty using the PFC input terminal requirement current value and a PFC input terminal current value when the input voltage of the input power source is not distorted; and preventing, by the current controller, a divergence of the PFC input terminal current by deriving the PFC duty using a distortion frequency when the input voltage of the input power source is distorted.

The determining of whether the input voltage of the input power source is distorted can include: generating, by the distortion compensator, a monitoring voltage having the same frequency as the input power source and the same phase as the input voltage of the input power source through a phase locked loop from the input voltage of the input power source; calculating the distortion frequency of the input power source based on a difference between the monitoring voltage and the input voltage input in real-time; and determining that the input voltage of the input power source is distorted when the distortion frequency is greater than or equal to a PFC current control band.

The preventing of the divergence of the PFC input terminal current can include deriving, by the current controller, the PFC input terminal requirement current value by dividing the monitoring voltage by a monitoring voltage peak value so as to scale the monitoring voltage and by multiplying the scaled input voltage value by the output of the voltage controller.

The preventing of the divergence of the PFC input terminal current can include deriving, by the current controller, the PFC duty by performing proportional-resonant (PR) control over the PFC input terminal current such that the PFC input terminal current corresponds the PFC input terminal requirement current value using the frequency and the distortion frequency of the input power source.

According to the embodiments of the present disclosure, when distortion of an input voltage occurs, it is possible to reduce an input overcurrent, improve shutdown of an OBC, and decrease charge delay due to the shutdown, by controlling a PFC input terminal current so that the PFC input terminal current is maintained according to a sine wave similar to that which occurs before the distortion occurs.

BRIEF DESCRIPTION OF THE DRAWINGS

The above and other objects, features and other advantages of the present disclosure will be more clearly understood from the following detailed description when taken in conjunction with the accompanying drawings, in which.

Figure 1:
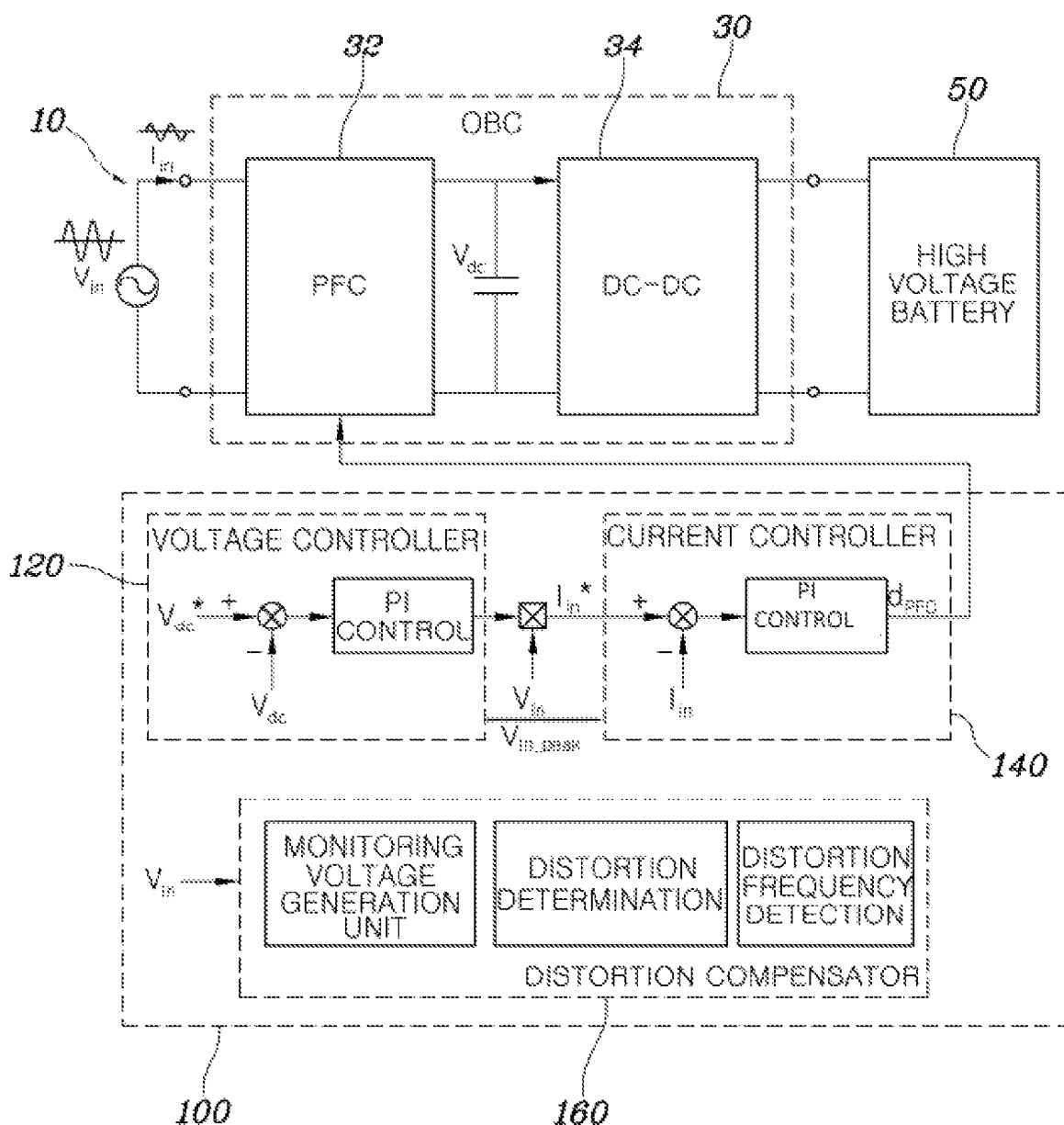
FIG. 1 and FIG. 2 are conceptual diagrams of a PFC controller according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinbelow, exemplary embodiments of the present disclosure will be described in detail with reference to the accompanying drawings. Throughout the drawings, the same reference numerals will refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 2:
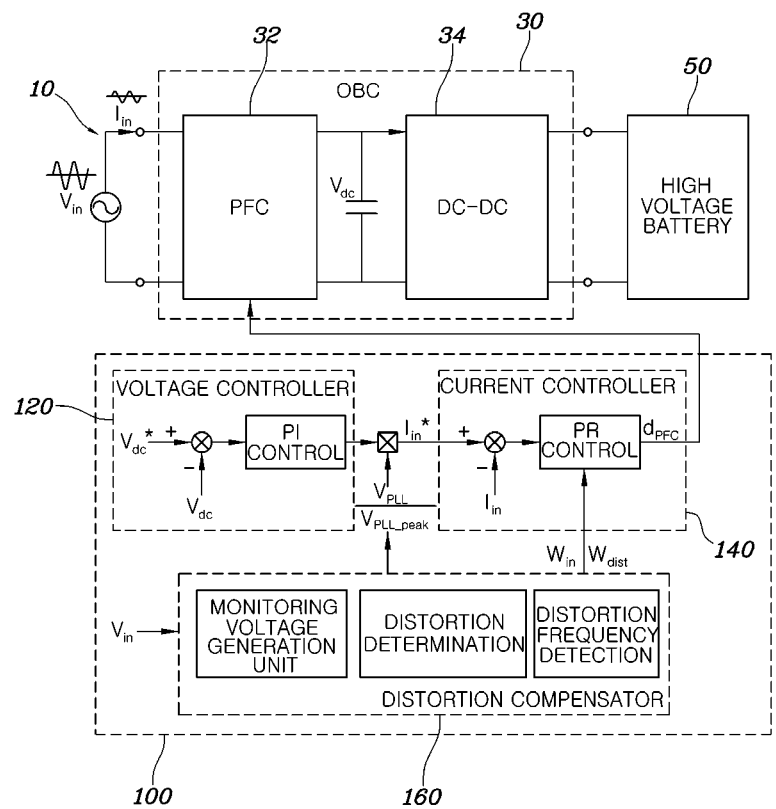

FIG. 1 and FIG. 2 are conceptual diagrams of the PFC controller according to embodiments of the present disclosure. As shown in FIGS. 1 and 2, external alternating current power source 10 is connected to a vehicle and the external alternating current power source 10 is connected to an OBC 30 of the vehicle. OBC 30 is configured of a PFC 21 and a high-voltage converter 34. A high-voltage battery 50 is charged or discharged through the high-voltage converter 34.

The present disclosure relates to a controller 100 that controls the PFC. The PFC controller 100 according to the present disclosure includes: a voltage controller 120 that controls a PFC output terminal voltage using a PFC output terminal voltage value and a PFC output terminal requirement voltage value; a current controller 140 that controls a PFC input terminal current by deriving a PFC input terminal requirement current value using an output of the voltage controller 120 and by deriving a PFC duty using the PFC input terminal requirement current value and a PFC input terminal current value; and a distortion compensator 160 that monitors an input voltage of an input power source, determines whether the input voltage is distorted, and prevents a divergence of the PFC input terminal current by transmitting a distortion frequency to the current controller 140 when the input voltage is distorted.

The PFC controller is configured of the voltage controller 120, the current controller 140, and the distortion compensator 160. The voltage controller 120 has a basic role of controlling the PFC output terminal voltage using the PFC output terminal voltage value and the PFC output terminal requirement voltage value. In addition, the current controller 140 controls the PFC input terminal current by deriving the PFC input terminal requirement current value using the output of the voltage controller 120 and deriving the PFC duty using the PFC input terminal requirement current value and the PFC input terminal current value.

In addition, the distortion compensator 160 monitors the input voltage of the input power source, determines whether or not the input voltage is distorted, and prevents the divergence of the PFC input terminal current by transmitting the distortion frequency to the current controller 140 in a case where the input voltage is distorted.

In addition, as shown in FIG. 1, the PFC output terminal voltage $V_{dc}$ is a DC link terminal voltage between a PFC and the high-voltage converter.

In addition, as shown in FIG. 1, the voltage controller may perform a proportional-integral (PI) control so that the PFC output terminal voltage follows the PFC output terminal requirement voltage value. Basically, in a general case where the distortion compensator 160 determines that the input voltage is not distorted, as shown in FIG. 1, the current controller 140 may derive the PFC input terminal requirement current value $I_{in}^*$ by dividing the input voltage $V_{in}$ of the input power source by an input voltage peak value $V_{in\_peak}$ so as to scale the input voltage and by multiplying the scaled input voltage value by the output of the voltage controller 120. In addition, the current controller 140 may derive the PFC duty $d_{pfc}$ by performing a PI control so that the PFC input terminal current $I_{in}$ follows the PFC input terminal requirement current value $I_{in}^*$.

Figure 3:
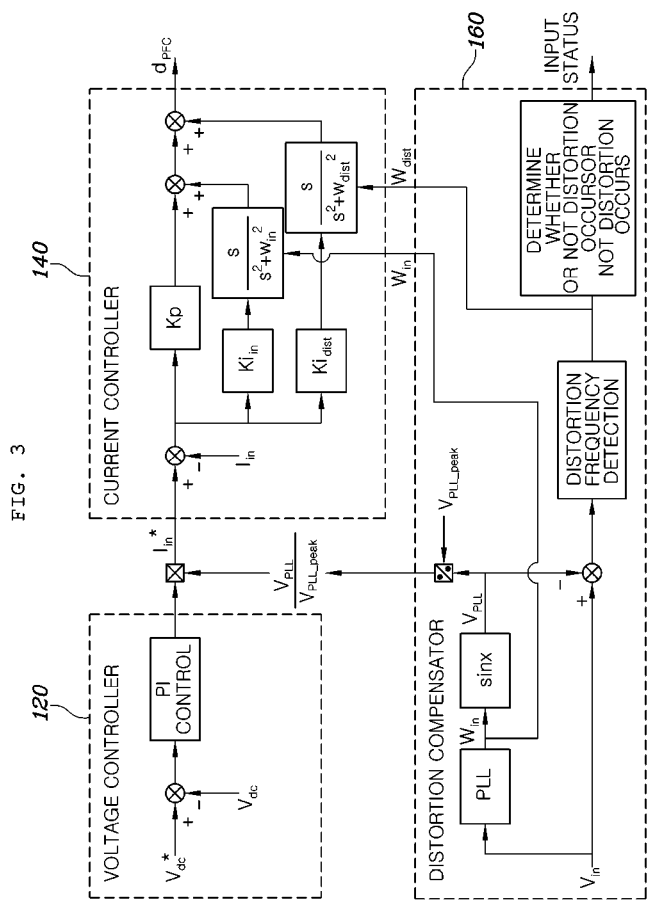
FIG. 3 is a block diagram of the PFC controller according to embodiments of the present disclosure.
Figure 4:
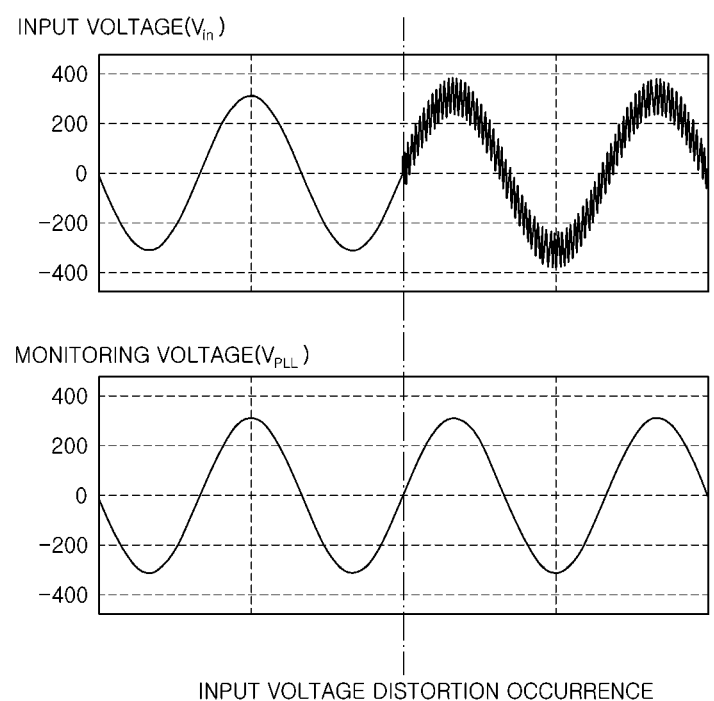
FIG. 4 is a graph comparing a distortion of an input voltage with a monitoring voltage.

However, when the input power source is distorted, in order to prevent an input overcurrent, a control of the present disclosure is specifically required. To this end, as shown in FIG. 2 and FIG. 3, the distortion compensator 160 may generate a monitoring voltage $V_{PLL}$ having the same phase as the input voltage through a phase locked loop (PLL) from the input voltage $V_{in}$ of the input power source, calculate the distortion frequency $W_{dist}$ of the input power source through a difference between the monitoring voltage $V_{PLL}$ and the input voltage $V_{in}$ input in real-time, and determines that the input voltage is distorted in a case where the distortion frequency $W_{dist}$ is equal to or higher than a PFC current control band $W_{BW}$. Here, PFC current control band $W_{BW}$ may be ½₀ of a PFC switching frequency.

Meanwhile, in a case where the distortion compensator 160 determines that the input voltage $V_{in}$ is distorted, as shown in FIG. 2, the current controller 140 may derive the PFC input terminal requirement current value $I_{in}^*$ by dividing the monitoring voltage $V_{PLL}$ by a monitoring voltage peak value $V_{PLL\_peak}$ so as to scale the monitoring voltage, and by multiplying the scaled input voltage value by the output of the voltage controller 120. In addition, the distortion compensator 160 may calculate a frequency $W_{in}$ of the input power source through the phase locked loop PLL from the input voltage $V_{in}$ of the input power source.

When the distortion compensator 160 determines that the input voltage is distorted, the current controller 140 may derives the PFC duty $d_{pfc}$ by performing PR control so that the PFC input terminal current $I_{in}$ follows the PFC input terminal requirement current value $I_{in}^*$ using the frequency $W_{in}$ and the distortion frequency $W_{dist}$ of the input power source. That is, when the input power source is distorted, the current controller 140 performs the PR control not the PI control. As shown in FIG. 3, the PR control uses the frequency $W_{in}$ and the distortion frequency $W_{dist}$ of the input power source so that a current stably follows a desired current.

Specifically, the frequency $W_{in}$ of the input power source is detected through the input voltage $V_{in}$ and the phase locked loop PLL. A sine wave having the same phase as the $V_{in}$ is generated as the monitoring voltage $V_{PLL}$ using the $W_{in}$. Since the PLL is used, although the input voltage $V_{in}$ is distorted, the monitoring voltage $V_{PLL}$ maintains the sine wave. A signal $V_{PLL}/V_{PLL\_peak}$ necessary for generating a current instruction is generated using the monitoring voltage.

Figure 5:
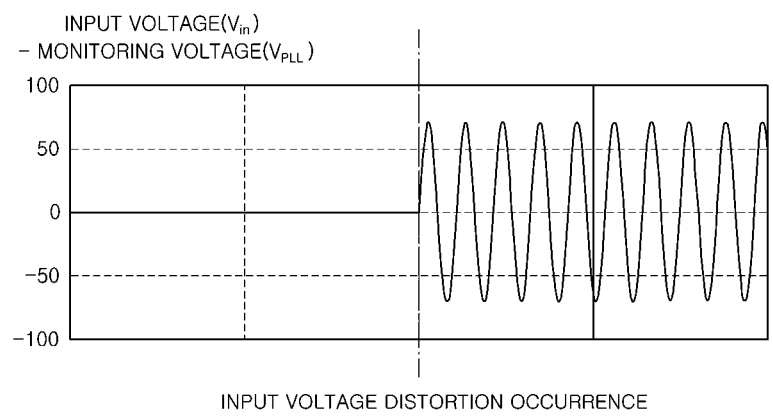
FIG. 5 is a graph illustrating a distortion component of the input voltage.

In addition, the difference between the input voltage $V_{in}$ and the monitoring voltage $V_{PLL}$ is shown in FIG. 5. The frequency $W_{dist}$ of the distortion component may be detected in various methods. One method involves measuring the time at which the distortion component is zero-crossed and then calculating the frequency inversely.

When the detected distortion frequency is greater than or equal to the PFC current control band (the PFC current control band is generally selected to be about ½0 of the PFC switching frequency), the detected distortion frequency is determined to be a harmful component that may cause the input overcurrent (input status). When it is determined that the detected distortion frequency is a harmful component, the signals $V_{PLL}/V_{PLL\_peak}$, $W_{in}$, and $W_{dist}$ generated by a voltage distortion compensator are reflected to the PFC controller.

Figure 6:
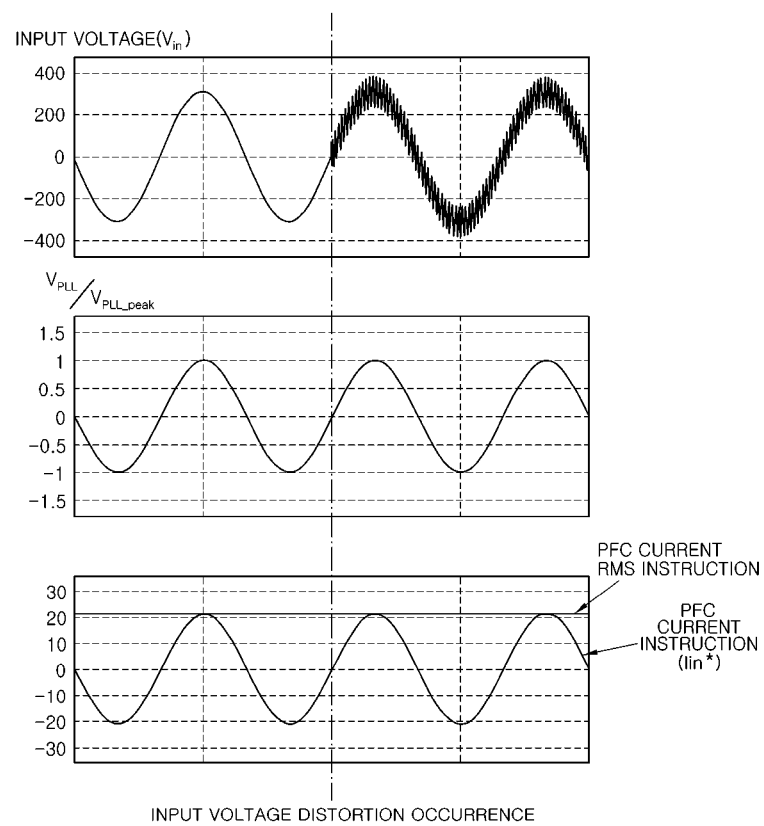
FIG. 6 is a graph illustrating the monitoring voltage and a PFC input terminal requirement current value of the PFC controller according to embodiments of the present disclosure.

In order to generate the PFC current instruction, the output (i.e., PFC current instruction RMS instruction) of the voltage controller 120 is multiplied by a 'signal having the same shape as the monitoring voltage and having the magnitude of 1'. In a case where the monitoring voltage is used without using the input voltage, as shown in FIG. 6, although the input voltage is distorted, a sine wave current instruction with which a harmonic wave is not mixed.

Figure 7:
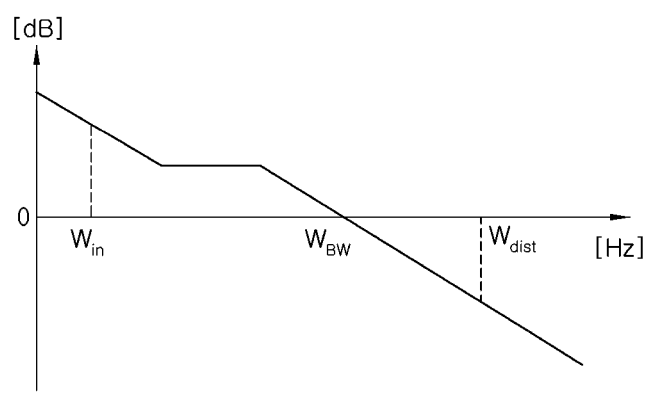
FIG. 7 is a diagram illustrating a gain in a case of a PI control of the PFC controller according to embodiments of the present disclosure.

Although the PFC current instruction is generated by a sine wave, when a PI controller is used, the input current $I_{in}$ is not able to follow the current instruction. As shown in FIG. 7, since a gain is larger than 0 dB at a frequency lower than the current control band $W_{BW}$, errors of the current instruction $I_{in}*$ and the input current are reduced, and thus the current instruction may be followed. Since the gain is very large at the input voltage frequency $W_{in}$, the current instruction is well followed with respect to the input voltage frequency component.

On the other hand, when the input voltage distortion frequency $W_{dist}$ is higher than the current control band, since the gain of the controller is less than 0 dB, the errors of the current instruction and the input current increase, and thus the input current diverges.

Figure 8:
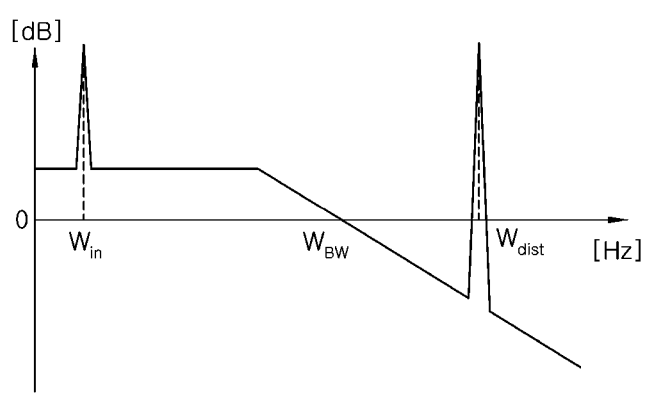
FIG. 8 is a diagram illustrating a gain in a case of a PR control of the PFC controller according to embodiments of the present disclosure.

In this case, as shown in FIG. 8, a proportional-resonant (PR) controller increases the control gain close to infinity at a specific frequency to reduce the input current error relative to the current instruction of the specific frequency. Therefore, although the distortion higher than the current control band occurs, the input current follows the current instruction. However, a performance of the PR controller may be guaranteed only in a case where the distortion compensator 160 accurately extracts the $W_{in}$ and the $W_{dist}$.

In a conventional control method, when distortion occurs, the distortion component of the input voltage is reflected to the current instruction. In addition, since the PI control is used, in a case where the frequency of the distortion component is higher than the control band, the input current is not able to follow the current instruction. Therefore, a current control is unstable and thus the input overcurrent may occur.

However, in the control method of the present disclosure, when the input voltage is distorted, since the distortion component is not reflected to the current instruction using the monitoring voltage, the current instruction has the form of the sine wave. In addition, the PR controller reflecting the distortion frequency is used so that the input current having the distortion component of a high frequency follows the sine wave current instruction. Therefore, the input current follows the current instruction through the sine wave current instruction and the PR controller, and thus the input current is controlled as the sine wave. Thus, a ripple magnitude of the input current can be considerably reduced and a probability of the input overcurrent can be reduced as compared with the conventional control method.

When the input voltage is distorted, the present disclosure prevents a case where the PFC current control (i.e., OBC input current) diverges by determining the distortion and changing the PFC current instruction and a structure of the current controller through the voltage distortion compensator. Therefore, the OBC input overcurrent may be prevented in a system under a poor environment and a charge power may not be limited. That is, the present disclosure can improve merchantability by reducing the OBC shutdown probability as well as the charge time.

Figure 9:
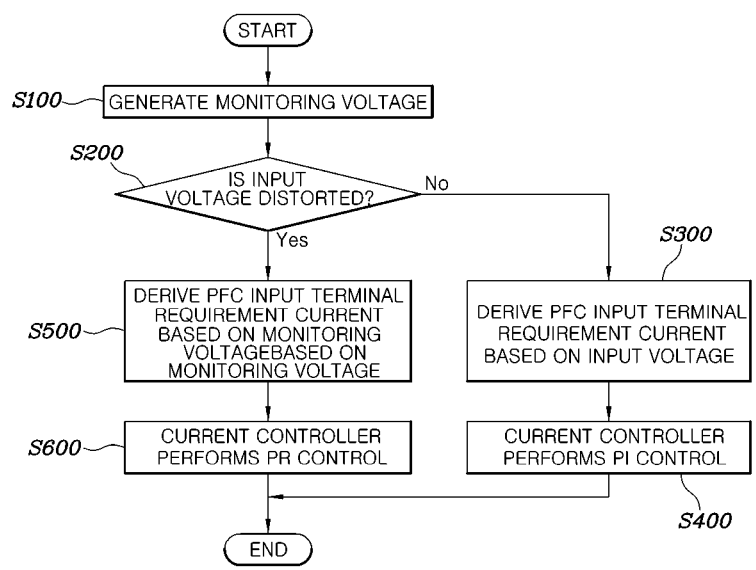
FIG. 9 is a flowchart of a PFC control method according to embodiments of the present disclosure.

Meanwhile, as shown in FIG. 9, a method of controlling the PFC controller of the present disclosure includes: monitoring an input voltage of an input power source and determining whether or not the input voltage is distorted by a distortion compensator 160 (S200); when the input voltage is not distorted, deriving a PFC input terminal requirement current value using an output of a voltage controller 120 by a current controller 140 (S300) and deriving a PFC duty using the PFC input terminal requirement current value and a PFC input terminal current value by the current controller 140 (S400); and when the input voltage is distorted, preventing a divergence of the PFC input terminal current by deriving the PFC duty using a distortion frequency by the current controller 140 (S600).

When determining whether or not the input voltage is distorted (S200), the distortion compensator 160 may generate a monitoring voltage having the same frequency as the input power source and the same phase as the input voltage through a phase locked loop from the input voltage of the input power source (S100), calculate the distortion frequency of the input power source through a difference between the monitoring voltage and the input voltage input in real-time, and determine that the input voltage is distorted in a case where the distortion frequency is greater than or equal to a PFC current control band.

When preventing the divergence of the PFC input terminal current, the current controller 140 may derive the PFC input terminal requirement current value by dividing the monitoring voltage by a monitoring voltage peak value to scale the monitoring voltage and multiplying the scaled input voltage value by the output of the voltage controller 120 (S500).

When preventing the divergence of the PFC input terminal current (S600), the current controller 140 may derive the PFC duty by performing a PR control so that the PFC input terminal current follows the PFC input terminal requirement current value using the frequency and the distortion frequency of the input power source.

According to embodiments of the present disclosure, by utilizing the PFC controller and the method of controlling the PFC controller when the distortion of an input voltage occurs, it is possible to reduce an input overcurrent, improve a shutdown of an OBC, and decrease a charge delay due to the shutdown, by controlling a PFC input terminal current so that the PFC input terminal current is maintained according to a sine wave similar to that before the distortion occurs.

Although certain embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A power factor correction (PFC) controller comprising:
   a voltage controller configured to control a PFC output terminal voltage using a PFC output terminal voltage value and a PFC output terminal requirement voltage value;
   a current controller configured to control a PFC input terminal current by deriving a PFC input terminal requirement current value using an output of the voltage controller and by deriving a PFC duty using the PFC input terminal requirement current value and a PFC input terminal current value; and a distortion compensator configured to monitor an input voltage of an input power source, determine whether the input voltage is distorted by harmonics, and prevent a divergence of the PFC input terminal current by transmitting a distortion frequency to the current controller when the input voltage is distorted, wherein the distortion compensator generates a monitoring voltage having the same phase as the input voltage of the input power source through a phase locked loop from the input voltage of the input power source, calculates the distortion frequency of the input power source based on a difference between the monitoring voltage and the input voltage input in real-time, and determines that the input voltage is distorted when the distortion frequency is greater than or equal to a PFC current control band, and wherein, when the distortion compensator determines that the input voltage of the input power source is distorted, the current controller derives the PFC input terminal requirement current value by dividing the monitoring voltage by a monitoring voltage peak value so as to scale the monitoring voltage and by multiplying the scaled input voltage value by the output of the voltage controller.

2. The PFC controller of claim 1, wherein the PFC output terminal voltage is a DC link terminal voltage between a PFC and a high-voltage converter.

3. The PFC controller of claim 1, wherein the voltage controller performs proportional-integral (PI) control over the PFC output terminal voltage such that the PFC output terminal voltage corresponds to the PFC output terminal requirement voltage value.

4. The PFC controller of claim 1, wherein, when the distortion compensator determines that the input voltage is not distorted, the current controller derives the PFC input terminal requirement current value by dividing the input voltage of the input power source by an input voltage peak value so as to scale the input voltage and by multiplying the scaled input voltage value by the output of the voltage controller.

5. The PFC controller of claim 4, wherein, when the distortion compensator determines that the input voltage is not distorted, the current controller derives the PFC duty by performing proportional-integral (PI) control over the PFC output terminal voltage such that the PFC input terminal current corresponds to the PFC input terminal requirement current value.

6. The PFC controller of claim 1, wherein the PFC current control band is 1/20 of a PFC switching frequency.

7. The PFC controller of claim 1, wherein the distortion compensator calculates a frequency of the input power source based on the phase locked loop from the input voltage of the input power source.

8. The PFC controller of claim 7, wherein, when the distortion compensator determines that the input voltage of the input power source is distorted, the current controller derives the PFC duty by performing proportional-resonant (PR) control over the PFC input terminal current such that the PFC input terminal current corresponds to the PFC input terminal requirement current value using the frequency of the input power source and the distortion frequency of the input power source.

9. A power factor correction (PFC) control method for controlling a PFC controller, the PFC control method comprising:

monitoring, by a distortion compensator, an input voltage of an input power source;

determining, by the distortion compensator, whether the input voltage of the input power source is distorted by harmonics;

deriving, by a current controller, a PFC input terminal requirement current value using an output of a voltage controller, deriving, by the current controller, a PFC duty using the PFC input terminal requirement current value and a PFC input terminal current value when the input voltage of the input power source is not distorted; and preventing, by the current controller, a divergence of the PFC input terminal current by deriving the PFC duty using a distortion frequency when the input voltage of the input power source is distorted, wherein the determining of whether the input voltage of the input power source is distorted comprises:

generating, by the distortion compensator, a monitoring voltage having the same frequency as the input power source and the same phase as the input voltage of the input power source through a phase locked loop from the input voltage of the input power source;

calculating the distortion frequency of the input power source based on a difference between the monitoring voltage and the input voltage input in real-time; and determining that the input voltage of the input power source is distorted when the distortion frequency is greater than or equal to a PFC current control band, and wherein the preventing of the divergence of the PFC input terminal current comprises deriving, by the current controller, the PFC input terminal requirement current value by dividing the monitoring voltage by a monitoring voltage peak value so as to scale the monitoring voltage and by multiplying the scaled input voltage value by the output of the voltage controller.

10. The PFC control method of claim 9, wherein the preventing of the divergence of the PFC input terminal current comprises deriving, by the current controller, the PFC duty by performing proportional-resonant (PR) control over the PFC input terminal current such that the PFC input terminal current corresponds the PFC input terminal requirement current value using the frequency and the distortion frequency of the input power source.

* * * * *